(12) United States Patent
Saccomanno

(10) Patent No.: US 6,553,168 B2
(45) Date of Patent: Apr. 22, 2003

(54) PROJECTION SYSTEM UTILIZING FIBER OPTIC ILLUMINATION

(75) Inventor: Robert J. Saccomanno, Montville, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/860,731

(22) Filed: May 18, 2001

(65) Prior Publication Data

US 2001/0048801 A1 Dec. 6, 2001

Related U.S. Application Data

(60) Provisional application No. 60/206,386, filed on May 23, 2000.

(51) Int. Cl.[7] ................................................. G02B 6/06

(52) U.S. Cl. ........................ 385/116; 385/115; 385/901; 385/119; 385/124

(58) Field of Search ................................. 385/901, 115, 385/116, 119, 124

(56) References Cited

U.S. PATENT DOCUMENTS

| | | | |
|---|---|---|---|
| 5,136,390 A | 8/1992 | Inova et al. | 358/231 |
| 5,765,934 A | 6/1998 | Shinji et al. | 353/94 |
| 5,902,030 A | 5/1999 | Blanchard | 353/30 |
| 6,005,649 A * | 12/1999 | Krusius et al. | 349/20 |
| 6,017,123 A | 1/2000 | Bleha et al. | 353/30 |
| 6,042,238 A | 3/2000 | Blackham | 353/94 |
| 6,043,797 A | 3/2000 | Clifton | 345/1 |
| 6,082,862 A | 7/2000 | Popovich | 353/30 |
| 6,115,022 A | 9/2000 | Mayer, III | 345/112 |
| 6,212,013 B1 | 4/2001 | Kodama | 359/634 |
| 6,219,977 B1 * | 4/2001 | Chao et al. | 52/198 |
| 6,250,763 B1 * | 6/2001 | Fielding et al. | 348/771 |
| 6,309,072 B1 * | 10/2001 | Deter | 348/750 |
| 6,363,667 B2 * | 4/2002 | O'Neill | 359/597 |

* cited by examiner

Primary Examiner—Robert H. Kim
Assistant Examiner—Richard Kim

(57) ABSTRACT

A projection display composed of a plurality of tiles (101) is illuminated by a plurality of projectors (400), one for each tile. The light from a plurality of light engines (200) is combined in a homogenizer to form a common illumination source which is then separated by a light separation unit (300) into individual primary colors. The individual primary colors are then transmitted over a second set of fiber optic cables (502) to the individual projectors.

14 Claims, 4 Drawing Sheets

PROJECTION SYSTEM UTILIZING FIBER OPTIC ILLUMINATION

CROSS-REFERENCE TO RELATED APPLICATIONS

This application claims priority from U.S. Provisional Patent Application Serial No. 60/206,386 entitled, "PROJECTION SYSTEM UTILIZING FIBER OPTIC ILLUMINATION", and filed on May 23, 2000. The contents of U.S. Provisional Patent Application Serial No. 60/206,386 are fully incorporated herein by reference.

A light source suitable for use with the present invention is described in U.S. patent application Ser. No. 09/346,253, filed Jul. 1, 1999, and entitled "SYSTEM HAVING A LIGHT SOURCE SEPARATE FROM A DISPLAY DEVICE" assigned to the assignee of the present application.

FEDERALLY SPONSORED RESEARCH OF DEVELOPMENT

Not Applicable.

BACKGROUND OF THE INVENTION

1. Technical Field

This invention relates to a large projection display apparatus, used for example, to display video images, and more particularly to a tiled display system with multiple projectors using fiber optics and a co to route illumination from one or more remote light sources to these projectors.

2. Background Art

There is an anticipated demand among consumers for high-definition large screen displays for such applications as home theater and advertising. Typical liquid crystal displays (LCD) for consumer applications have SVGA resolution of approximately 600×800 pixels, although high-end projection displays have been introduced with up to 1920×1080. Displaying such low resolution on a large display yields unacceptable picture quality; for instance an SVGA display projected as a 10-foot diagonal image has a minimum pixel size of approximately ⅛-inch by ⅛-inch. Furthermore, high-definition television HDTV has a width to height aspect ratio of 16:9 as opposed to computer monitors and standard television, which have a width to height aspect ratio of 4:3.

There have been several attempts in the past to make a large size projection display, based on combining several smaller projected image 'tiles' into a larger composite tiled image, such as in Bleha, et al (U.S. Pat. No. 6,017,123). These prior art systems have generally proved less than satisfactory, because of a lack of both brightness and color uniformity between the tiles. This lack of uniformity is typically caused by the use of multiple projection lamps where each lamp exhibits differing brightness and color characteristics as compared to the other lamps in the system. Even if matching light sources, typically metal halide lamps, are chosen, the brightness and color characteristics will change as the lamps age.

In an attempt to compensate for this lack of brightness and color uniformity, the prior art teaches a camera connected to an image processing function that individually modifies each projected image such as described in Johnson et al, (U.S. Pat. No. 6,219,099). Disadvantageously, the Johnson image processing function sacrifices a number of gray shades available for the displayed image in order to compensate for the lack of brightness and color uniformity between the projected tiles.

Another problem with prior art projection displays is that a high-intensity light source, such as a metal halide lamp, is required and this high-intensity light source typically produces a large amount of heat that can reduce the reliability of projection image display elements such as liquid crystal displays.

FIG. 1 shows an example of a conventional projection type display apparatus as discussed in Kodama, et al. (U.S. Pat. No. 6,212,013), which would be used for a single display or for each display tile of a tiled display.

Referring to FIG. 1, white light emitted from a light source unit 1 having a reflector 2 travels through lenses 3 and 4, converter 5, and lens 6, impinging upon a dichroic mirror DM1 which transmits a red light component R but reflects a green light component and a blue light component. Then the red light component transmitted by the dichroic mirror DM1 is reflected by a total reflection mirror M1 through a field lens 7R and a trimming filter TR into a red image display element 8R, in which the red light component is optically modulated according to an input signal. The red light component light thus optically modulated is combined with a modulated blue light component and a modulated green light component within a dichroic prism 9 and transmitted into a projection lens 10.

On the other hand, among the blue and green light components reflected by the dichroic mirror DM1, the green light component G is reflected by another dichroic mirror DM2 through a field lens 7G and a trimming filter TG into a green image display element 8G, in which the green light component is optically modulated according to an input signal. The green light component light thus optically modulated is combined with the modulated red light component and a modulated blue light component within the dichroic prism 9 and transmitted into the projection lens 10. Further, the blue light component B transmitted by the dichroic mirror DM2 travels via a condenser lens 11, a total reflection mirror M2, a relay lens 12, a total reflection mirror M3, and a field lens 7B into a blue image display element 8B, in which the blue light component is optically modulated according to an input signal. The blue light component thus optically modulated is combined with the modulated red light component and the modulated green light component within the dichroic prism 9 and transmitted into the projection lens 10. Then trichromatic light combined by the combining dichroic prism 9 is projected by the projection lens 10 toward a target screen or display tile, not shown.

There continues to be long felt need in the display industry for a high-definition large screen with uniform color and brightness characteristics and with a high-intensity light source for a tiled projection display.

SUMMARY OF THE INVENTION

My invention produces high-intensity white light from a common light source, separates this high-intensity white light into high-intensity primary color light components, and couples these high-intensity primary color light components to multiple projectors using fiber optic cables. Advantageously, my projection display system does not use a separate lamp for each display tile and thereby achieves uniform display brightness and color uniformity across the entire projected display area, for example 9 feet high by 16 feet wide. One novel aspect of my invention allows multiple light sources to be combined to provide lamp redundancy and yet act as a single light source with regard to both color and brightness uniformity.

One embodiment of my invention uses three imaging devices per display tile, such as transmissive polysilicon (Poly-Si) liquid crystal (LC) imaging devices, with each imaging device assigned to a primary color selected from the group of red, green, and blue.

Another embodiment of my invention uses a single imaging device to drive each display tile with all three primary colors in a frame sequential (FS) manner. In a particular embodiment, the frame sequence displays red information first, followed by green, and followed by blue in a perpetual cycle, at a rate fast enough to allow a human brain to integrate the images as if they were displayed simultaneously. Advantageously, this embodiment of my invention thus minimizes that total number of imaging devices required.

DETAILED DESCRIPTION OF THE INVENTION

Figure 1:
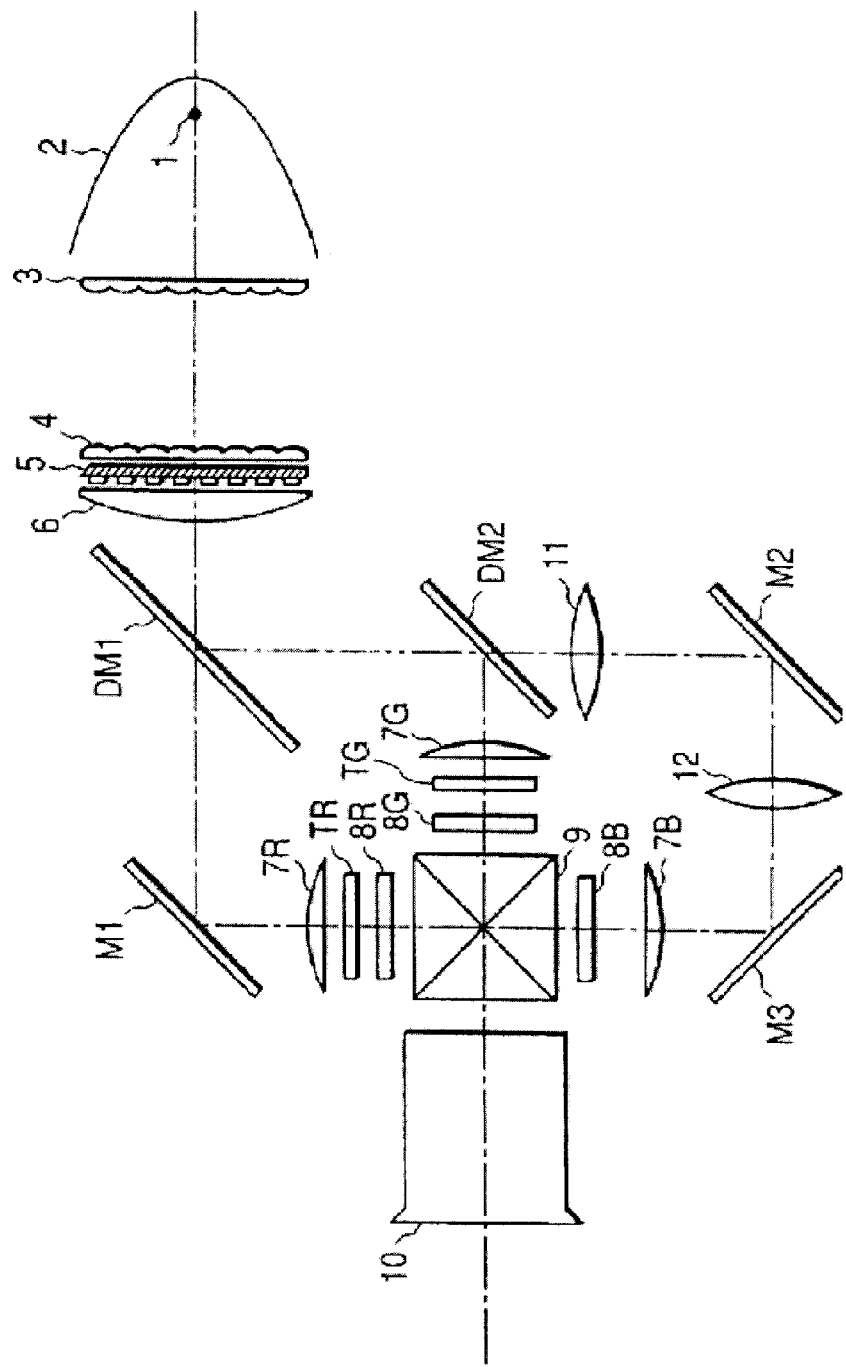
FIG. 1 shows an example of the conventional projection type display apparatus.
Figure 2:
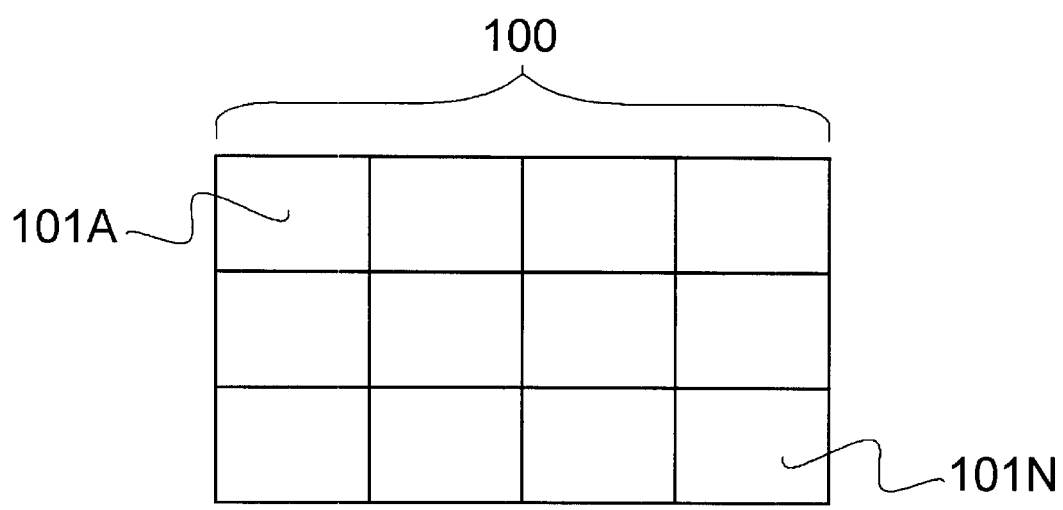
FIG. 2 shows a projection display image that is further broken down into twelve individual display tiles.

Referring first to FIG. 2, a tiled projected image 100 is composed of individual display tiles 101A . . . 101N. A preferred embodiment of my invention has a three-row by four-column array of display tiles as shown in FIG. 2. Further embodiments contemplated can have different tile configurations including non-rectangular display tiles, such as hexagons, and tile configurations where the composite projected display is non-rectangular, such as a triangle.

Figure 3:
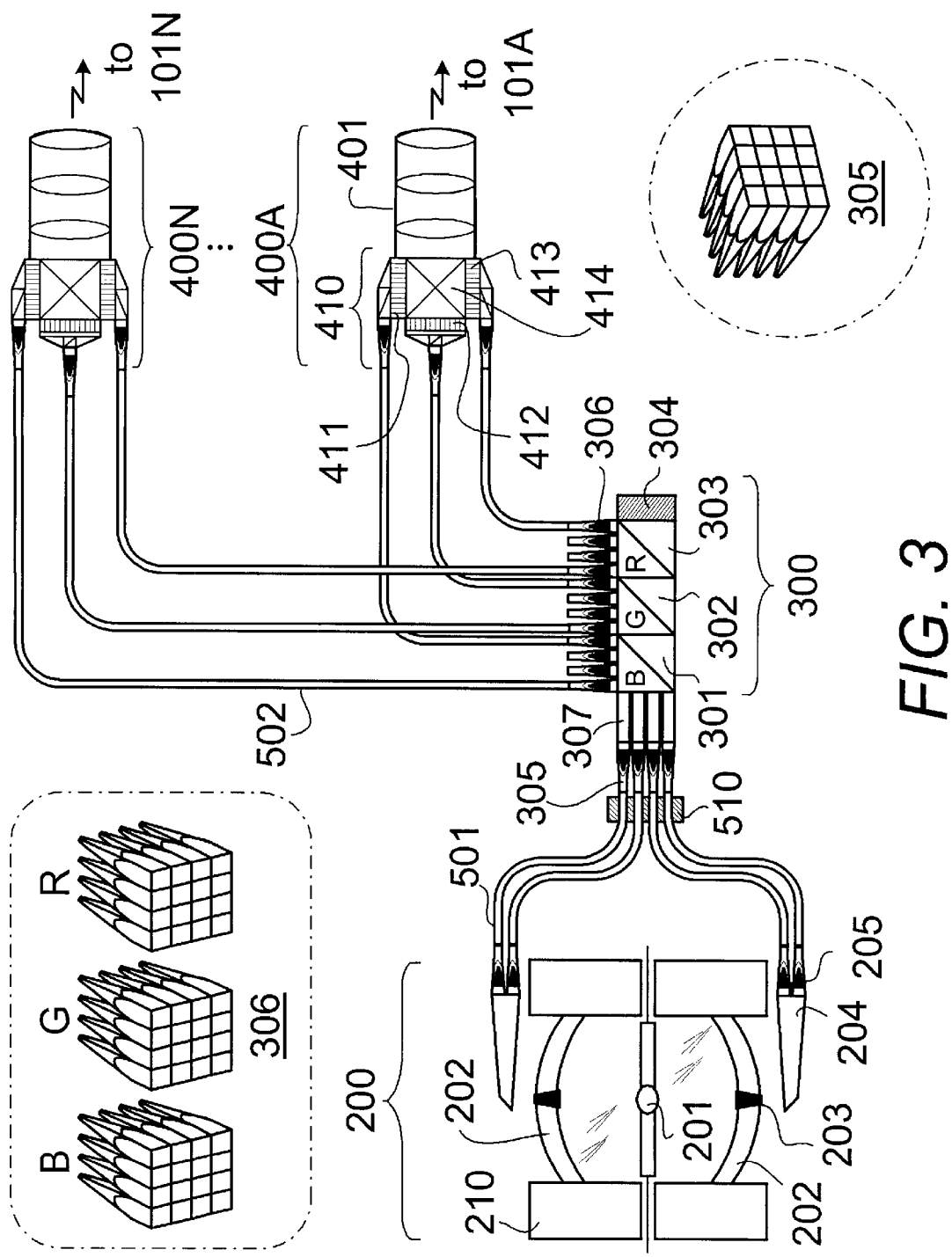
FIG. 3 shows one illustrative embodiment of my invention using transmissive polysilicon (Poly-Si) liquid crystal (LC) imaging devices operating in parallel. Three such devices are used, per display tile, with each device assigned to a primary color selected from the group of red, green, and blue.

Referring to FIG. 2 and FIG. 3, each display tile 101A . . . 101N displays a portion of a complete image as projected from an associated display projector 400A . . . 400N. Each display projector 400 comprises a projection lens assembly 401 and an imaging device 410. In one embodiment of my invention, the imaging device 410 comprises three transmissive polysilicon (Poly-Si) liquid crystal (LC) devices, consisting of a Blue LC device 411, a Green LC device 412, and a Red LC device 413, as well as combining optics 414.

Light is generated by a single light source or light engine 200, remote from the display projectors 400, and is routed by a first set of fiber optic cables 501 to a light separation unit 300. The light separation unit 300 receives the light, dims the light according to an external control, not shown, and separates the light into primary color components such as blue, green, and red. The primary color components are routed from the light separation unit 300 by a second set of fiber optic cables 502 to the display projectors 400A . . . 400N, where the display image is formed and projected onto display tiles 101A . . . 100N. Advantageously, a common light engine 200 is used to provide illumination for all display tiles 100A . . . 100N. Another embodiment of my invention provides redundant light engines 200, where the outputs of the light engines 200 are combined in a combining device, not shown, prior to entry into the light separation unit 300.

Referring to FIG. 3, consider the component parts of the light engine 200. A high-intensity lamp 201, such as an arc lamp, produces light that is reflected from elliptical mirrors 202 and exits through apertures 203. The light exiting apertures 203 is focused and concentrated in trapezoids 204 and concentrators 205. The light exits the light engine 200 via the concentrators 205. Support assembly structure 210 maintains the required alignment for the components within the light engine 200.

Consider the component parts of the light separation unit 300. The light routed to the light separation unit 300 is received into round-to-square morphing collimators 305. Suitable round-to-square morphing collimators are described in U.S. patent application Ser. No. 09/346,253. The round-to-square morphing collimators 305 provide sufficient collimation to allow high reflectance of both s-polarized light and p-polarized light by the primary color light separation units 301, 302, and 303, such as color sensitive optical shutters manufactured by Digilens Inc. It is also important to have adequate homogenization of the light entering the light separation unit 300 in order that the flux entering the second set of fiber optic cables 502 is equally distributed. Such homogenization may be accomplished between collimators 305 and the entrance to the first primary color light separation unit 301. In addition, due to losses in fibers 502, the path lengths and equivalent bends in the fibers 502 should remain relatively constant within a given projector 400 and between projectors 400A through 400N. In another embodiment, the light is pre-polarized before entering the color sensitive beam splitters 301, 302, and 303.

In a preferred embodiment, light exiting the round-to-square morphing collimator 305 is separated into the primary color components by a 'Blue' color sensitive beam splitter 301, a 'Green' color sensitive beam splitter 302, and a 'Red' color sensitive beam splitter 303 respectively. The 'Blue' color sensitive beam splitter 301, the 'Green' color sensitive beam splitter 302, and the 'Red' color sensitive beam splitter 303 provide color correction and dimming for each respective primary color component. Excess light, a by-product of the dimming and color correction function, is routed into beam dump 304. Advantageously, this inventive configuration allows for the elimination of the yellow/orange band of light prevalent in metal halide and high pressure mercury arc lamps that leads to red desaturation by configuring beam splitters 301, 302, and 303 to pass the band of light between 575 to 600 nanometers in wavelength and by causing beam dump 304 to absorb this light band.

Each primary color, blue, green, and red, light component is routed from the 'Blue' color sensitive beam splitter 301, the 'Green' color sensitive beam splitter 302, and the 'Red' color sensitive optical shutter unit 303 respectively into one of a plurality of square-to-round morphing concentrators 306. The round-to-square morphing collimator described application Ser. No. 09/346,253 may be also used as a square-to-round morphing concentrators when light is input at the square surface face and exits through the round surface face. The square-to-round morphing concentrators 306 are preferably tapered to optimize the optical throughput in consideration of the numerical aperture (NA) of the projectors 400 driven by the second set of fiber optic cables 502. In one illustrative embodiment, twelve display projectors 400A . . . 400N and thirty-six second fiber optic cables 502 are used to produce the projection display image 100 that is made up of twelve display tiles 101, as shown in FIG. 2, according to my invention.

Advantageously, the inventive configuration of the light separation unit, including a plurality of color sensitive beam splitters allows for the separation of the visible light spectrum into more than the traditional three primary colors—red, green, and blue. In one embodiment of my invention, more than three light color components can be used, such as three 30 nm wide green light components, e.g., 505 nm–535 nm, 535 nm–565 nm, and 565–595 nm.

In the embodiment of my invention depicted in FIG. 2, each display projector 400A . . . 400N functions in a similar manner. The separate primary color components are routed into imaging device 410, where each imaging device 410 further comprises a plurality of primary color imaging devices, such as a 'Blue' imaging device 411, a 'Green' imaging device 412, and a 'Red' imaging device 413. A set of individual primary color images are formed at each imaging device 410 by the plurality of primary color imaging devices and are combined into a full-color image in color combiner device 414. In this 'frame parallel' embodiment, all individual color images are present simultaneously in color combiner device 414. Multiple full-color images are projected from the display projectors 400A . . . 400N via projection lens assemblies 401 and combine to form a large tiled display 100 made up of individual display tiles 101A . . . 101N as described above.

Figure 4:
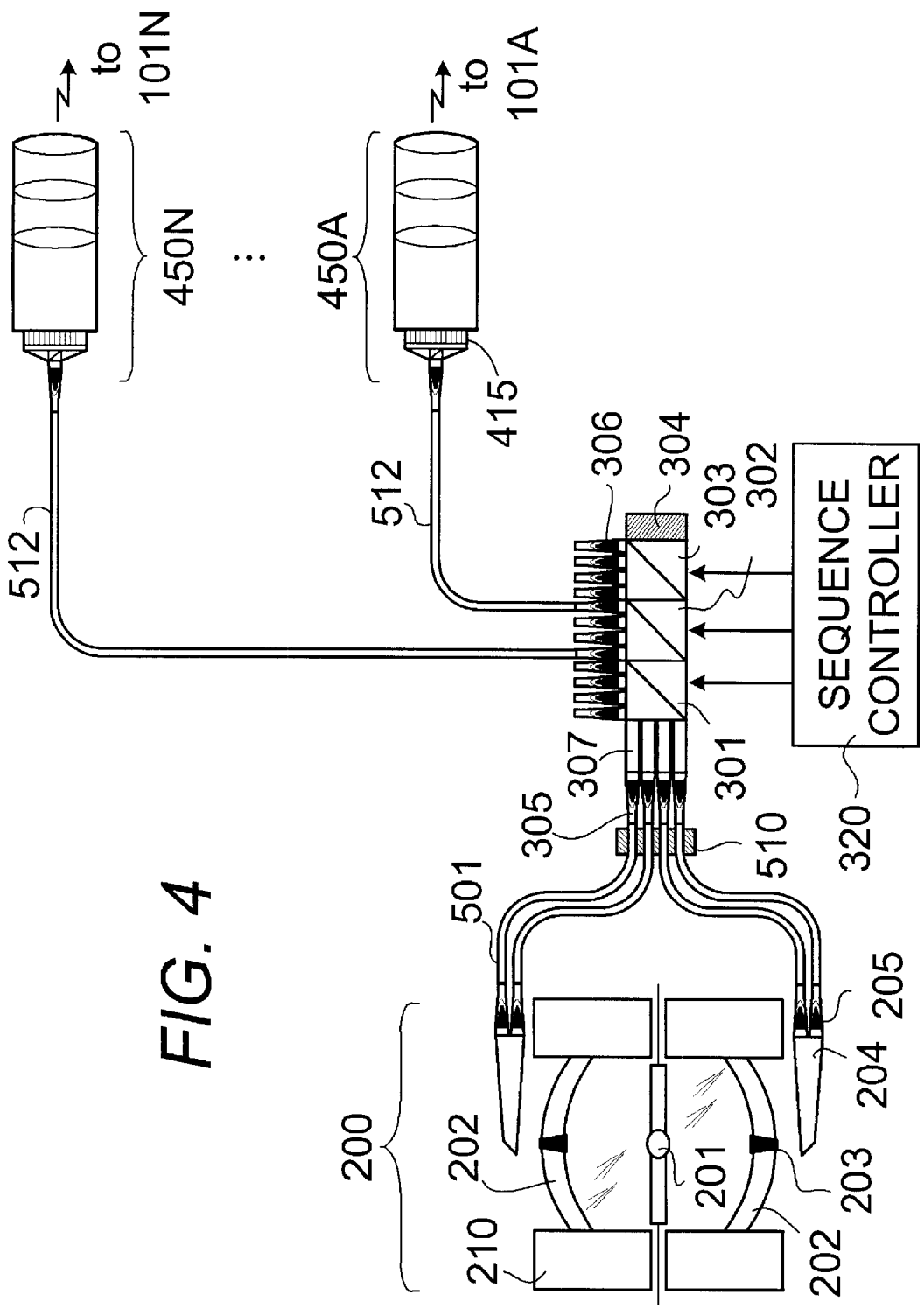
FIG. 4 shows another illustrative embodiment of my invention displaying color subframes in a sequential manner.

Turning now to FIG. 4, there is depicted another illustrative embodiment of my invention. In the prior embodiment of FIG. 3, the light separation unit 300 receives the light inputs from the first set of fiber optic cables 501 and separates the light spatially into the individual fiber optic cables 502 of the second set, by means of the optical shutter devices 301, 302, and 303, as described above. In this embodiment of FIG. 4, a light separation unit 350 separates the light sequentially into the separate color components and includes optical color sensitive devices 311, 312, and 313, each of which is caused to sequence through the primary colors, such as blue, green, and red, in a predetermined pattern by controller 320. The primary color outputs are then routed into the square-to-round morphing concentrators associated with individual ones of the sequential shutter devices 311, 312, and 313, and over fiber optic cables 512 to multiple display projectors 450A . . . 450N. In this embodiment, the individual colors are not then recombined in the display projectors 450, a color subframe sequence controlled by the controller 320 being at a rate sufficiently fast that the color combination can be effected through the viewers eye, as is known. Accordingly, each display projector 450 includes a single imaging device 415, which serves to image each of the sequential light colors transmitted to it over the fiber optic cable 512. Advantageously, this embodiment of my invention eliminates the need to associate color separation and recombination optics with each display projector, maintains the color balance between display projectors, and simplifies the construction of each display projector.

In one specific illustrative embodiment in accordance with FIG. 4, twelve display projectors 450 are utilized, each with an individual fiber optic cable 512 for the twelve display tiles 101, as shown in FIG. 2 Each of the sequential shutter devices 311, 312, and 313 is associated with four of the projectors 450.

In other embodiments of my invention, the visible light spectrum may be spatially separated into more than three 'primary' color light components.

Another embodiment of my invention uses a micro electromechanical system (MEMS) based imaging device instead of LC based imaging devices as described above. Other contemplated embodiments of my invention use other transmissive and reflective imaging devices, such as reflective liquid crystal on silicon (RCOS) to create the projected image.

Alternate embodiments may be devised without departing from the spirit or the scope of the invention.

What is claimed is:

1. A projection display system for a projection display composed of a plurality of individual tiles, said system comprising:
    (a) an illumination source producing light;
    (b) a homogenizer;
    (c) first fiber optic cables for transmitting the light from said source to said homogenizer, wherein each of the first fiber optic cables is connected to said homogenizer with a round-to-square morphing collimator;
    (d) a light separation unit for separating light into a plurality of individual component colors, wherein said light separation unit is adapted to receive light from said homogenizer; and
    (e) a plurality of projectors, wherein each of said projectors is associated with one of the tiles of the display and is adapted to receive the individual colors of the light from said light separation unit.

2. A projection display system in accordance with claim 1 wherein said light separation unit comprises a plurality of individual light separation devices each of which separates the light into a single component color.

3. A projection display system in accordance with claim 1 further comprising second fiber optic cables for transmitting said individual colors of the light from said light separation unit to said projectors.

4. A projection display system in accordance with claim 3 wherein said second fiber optic cables include an individual fiber optic cable for each component color from said individual light separation devices to said projectors.

5. A projection display system in accordance with claim 3 wherein each of said projectors includes combining optics for combining the individual component colors from said second fiber optic cables at each said projector and a projection lens for projecting the combined light onto a tile of the display.

6. A projection display system in accordance with claim 1 wherein said light separation unit separates the light into more than three component colors.

7. A projection display system in accordance with claim 1 wherein said light separation unit is connected to each of the second fiber optic cables with a square-to-round morphing concentrator.

8. The projection display system, according to claim 1 wherein said illumination source comprises a single light engine, wherein said light engine further comprises:
    a high-intensity lamp producing the light;
    a plurality of apertures;
    a plurality of elliptical mirrors reflecting the light produced by the high-intensity lamp to thereby cause said light to exit through said apertures; and
    wherein said apertures transmit the light to said first fiber optic cables.

9. A projection display system in accordance with claim 1 wherein said light separation unit sequentially separates light into a plurality of component colors.

10. A projection display system in accordance with claim 9 wherein said plurality of component colors includes more than three component colors.

11. A projection display system in accordance with claim 9 further comprising a sequence controller connected to said light separation unit for causing said unit to separate the light sequentially at a rate high enough to cause an individual looking at a display tile to see the light as combined.

12. A projection display system in accordance with claim 9 wherein said second plurality of cables includes a single fiber optic cable from said light separation unit to each of said projectors.

13. The projection display system, according to claim 1, wherein:
   (a) said illumination source comprises a plurality of tight engines each producing a separate light output;
   (b) each of said separate light outputs is connected to a portion of said fiber optic cables; and
   (c) said separate light outputs are homogenized by said homogenizer into a combined light output prior to entering said color separation unit.

14. A projection display system for a projection display composed of a plurality of individual tiles (101), said system comprising:
   (a) an illumination source comprising of a plurality of light engines (200) each producing a separate plurality of light outputs, wherein each of said light engines further comprises,
      (i) a high-intensity lamp (201) producing the separate light output;
      (ii) a plurality of apertures (203); and
      (iii) a plurality of mirrors reflecting the light produced by the high-intensity lamp to thereby cause said light to exit through said apertures;
   (b) a homogenizer (307) adapted to combine multiple light inputs;
   (c) a first plurality of fiber optic cables (501) for transmitting light from said illumination source to said homogenizer;
   (d) a plurality of morphing collimators (307), wherein each of said morphing collimators is mechanically adapted to connect a corresponding one of said first plurality of fiber optic cables to said homogenizer and is optically adapted to substantially collimate light passing through said morphing collimator;
   (d) a light separation unit (300) for separating light into a plurality of individual component colors, wherein said light separation unit is adapted to receive light from said homogenizer;
   (e) a plurality of projectors (400), wherein each of said projectors is associated with one of the tiles of the display and is adapted to receive the individual component colors of the light from said light separation unit;
   (f) a second plurality of fiber optic cables (502) for transmitting the individual component colors from said light separation unit to said projectors;
   (g) a plurality of morphing concentrators (306), wherein each of said morphing concentrators is mechanically adapted to connect a corresponding one of said second plurality of fiber optic cables to said homogenizer and is optically adapted to substantially concentrate light passing through said morphing concentrator; and
   (h) wherein each of said projectors includes an imaging device for modulating the individual component colors and a projection lens for projecting the light onto a corresponding tile of the display.

* * * * *